C. P. Kelsey,
Grain Cradle.
No. 63530.  Patented April 2, 1867.
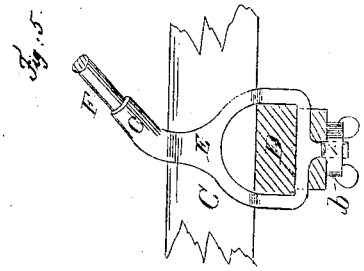
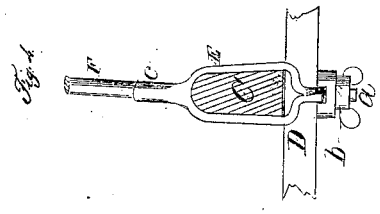
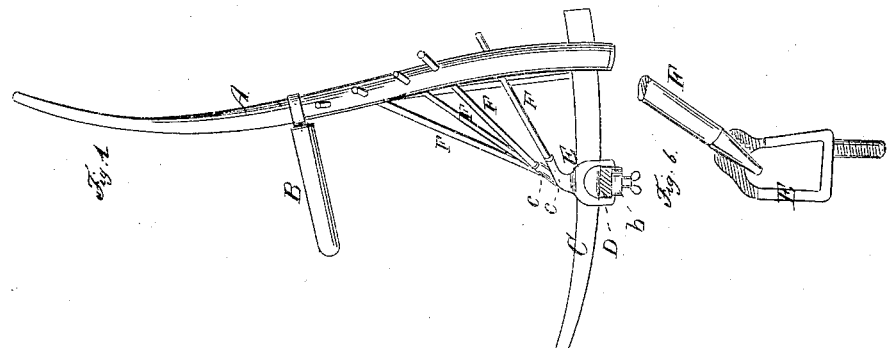
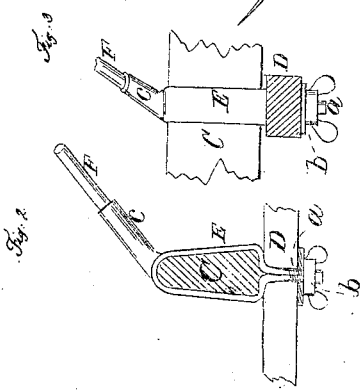
Witnesses.
F. A. Jackson
G. Adservice
Inventor.
C. P. Kelsey
Per Munn & Co
Attorneys

United States Patent Office.

C. P. KELSEY, OF LIVINGSTONVILLE, NEW YORK.

Letters Patent No. 63,530, dated April 2, 1867.

---

IMPROVEMENT IN GRAIN CRADLES.

---

The Schedule referred to in these Letters Patent and making part of the same.

---

TO ALL WHOM IT MAY CONCERN:

Be it known that I, C. P. KELSEY, of Livingstonville, in the county of Schoharie, and State of New York, have invented a new and improved Grain Cradle; and I do hereby declare that the following is a full, clear, and exact description thereof, which will enable others skilled in the art to make and use the same, reference being had to the accompanying drawings, forming a part of this specification.

This invention relates to a new and useful improvement in the construction of cradles for cutting grain and laying it evenly in swaths convenient for binding into sheaves after being sufficiently dried or cured.

The invention consists in a peculiar manner of securing the fingers of the cradle to the braces and cross-bars, whereby the fingers may be, with the greatest facility, adjusted to suit the length of the scythe. Grain cradles, as at present constructed, do not admit of the fingers being adjusted, and hence, very frequently, a scythe, longer or shorter than the fingers, must be necessarily used, which materially embarrasses the operation of cradling grain. In the accompanying drawings—

Figure 1 represents a side view of a grain cradle, constructed according to my invention.

Figures 2, 3, 4, 5, and 6, enlarged views of the sockets or clamps pertaining to the same.

Similar letters of reference indicate like parts.

A represents the handle or snath of the cradle, constructed in the usual form and provided with the ordinary "nib" B. C are the fingers, constructed of wood in the usual form, and bearing against cross-bars D. E represents sockets or clamps, constructed in the form of loops or eyes, to admit of the fingers passing through them. These sockets, as shown in figs. 2, 3, and 4, are provided with screws $a$, to pass through the bars D, said screws having nuts $b$ on their lower ends. By screwing up these nuts the bars D will be firmly clamped to the under sides of the sockets. In figs. 4 and 5 a preferable arrangement is shown, the bars D being in contact with the fingers within the sockets, so that by screwing up the nuts $b$ the fingers and bars will be firmly clamped in contact. In fig. 5 the socket extends around both the finger and cross-bar. The arrangement shown in figs. 2 and 3 requires, in case the fingers are loose in the sockets, keys or wedges being employed to keep them tight. The upper ends of the sockets E are provided with tubes $c$, in which the outer ends of the braces F are fitted and secured by pins or rivets, or said tubes may be provided with an internal screw-thread, so that the ends of the braces may be screwed into them, as shown in fig. 6. The inner ends of the braces F are inserted in the snath A, as usual, as shown in fig. 1. By this means it will be seen that the fingers C may, with the greatest facility, be adjusted longitudinally to suit scythes of different lengths, all that is required to effect this result being simply to unscrew the nuts $b$, if the sockets are arranged as shown in figs. 4 and 5, so as to loosen the fingers, or, if arranged as shown in figs. 2 and 3, the fingers are merely shoved or driven along in the sockets and keyed, if necessary.

Having thus described my invention, what I claim as new, and desire to secure by Letters Patent, is—

The sockets E applied to the fingers C, cross-bars D, and braces F, for the purpose of rendering the fingers capable of a longitudinal adjustment, substantially as and for the purpose set forth.

C. P. KELSEY.

Witnesses:
WM. F. McNAMARA,
ALEX. F. ROBERTS.